United States Patent [19]
Brock

[11] 3,718,202
[45] Feb. 27, 1973

[54] VEHICLE ANTI-THEFT SYSTEM
[75] Inventor: Donald J. Brock, Dallas, Tex.
[73] Assignee: Texas Instruments Incorporated, Dallas, Tex.
[22] Filed: May 20, 1970
[21] Appl. No.: 38,954

[52] U.S. Cl. ................180/114, 180/82, 317/134, 307/10
[51] Int. Cl. .............................................B60r 25/06
[58] Field of Search ...180/82; 317/134, 140; 307/10; 340/63, 53, 147 R; 200/42; 192/4

[56] References Cited

UNITED STATES PATENTS

| | | | |
|---|---|---|---|
| 3,544,804 | 12/1970 | Gaumer et al. | 180/114 X |
| 2,740,947 | 4/1956 | Davies | 180/82 X |
| 2,992,693 | 7/1961 | Peyton | 180/82 |
| 3,513,357 | 5/1970 | Dittmore | 317/134 |
| 3,428,033 | 2/1969 | Watts | 317/134 X |
| 3,321,673 | 5/1967 | Wolfe | 317/134 |
| 3,513,466 | 5/1970 | Isaacs et al. | 340/63 X |
| 1,972,300 | 9/1934 | Hemingway | 180/114 X |
| 3,021,913 | 2/1962 | Ouimet et al. | 180/114 |
| 3,203,501 | 8/1965 | Carter et al. | 340/53 X |
| 3,576,536 | 4/1971 | Wolfe | 340/147 |
| 3,624,602 | 11/1971 | LeDoux | 307/10 |

Primary Examiner—Kenneth H. Betts
Attorney—James O. Dixon, Andrew M. Hassell, Harold Levine and Rene' E. Grossman

[57] ABSTRACT

A system is disclosed which includes an encoder panel adapted to be mounted in an accessible location to enable the entering of a code sequence therein by an operator. A decoder circuit is remotely disposed in a secure location adjacent a lock mechanism and is responsive to the encoder panel to generate an electrical energizing signal only upon detection of a predetermined code which is entered into the encoder panel. Structure is connected to the decoder circuit which operates the lock mechanism only upon generation of the electrical energizing signal. In the preferred embodiment of the invention, the encoder panel is located in the passenger compartment of a vehicle. The decoder circuit is located in an area of the vehicle of difficult accessibility, such as within the vehicle transmission. The drive train of the vehicle is locked by the lock mechanism until a predetermined code is entered into the encoder panel. Circuitry may also be provided to prevent ignition of the vehicle motor until the predetermined code is entered into the encoder panel.

15 Claims, 9 Drawing Figures

VEHICLE ANTI-THEFT SYSTEM

This invention relates to security systems, and more particularly to theft prevention systems wherein a predetermined code must be entered into a control panel before a lock mechanism may be operated.

A wide variety of systems and techniques have been heretofore developed to prevent theft. In particular, numerous systems have been developed for use on automobiles to prevent theft or unauthorized usage thereof. Theft of automobiles is becoming an ever increasing problem due to the fact that ignition keys are often left in vehicles by careless owners, and also because ignition keys must often be left with parking lot attendants which provides opportunities for the duplication of the keys. Further, many conventional automobile locks are easily operated by master or trick keys. Vehicle ignition systems are also subject to being easily "jumpered" by the use of wires or harnesses which may be attached either under the engine hood or behind the instrument panel.

Prior anti-theft systems which attempted to prevent the use of duplicate or false keys have generally not prevented jumpering of the vehicle's ignition and have thus been unsatisfactory. Certain previously developed anti-theft systems have utilized combination locks or the like wherein a predetermined code must be entered before the vehicle may be operated. However, such prior systems have not generally prevented the ignition system of the car from being jumpered. Additionally, such previously developed anti-theft systems have presented practical problems in that the vehicle could not be easily left in a parking lot wherein the parking lot attendant was required to move the car. Additionally, many such combination lock systems have allowed a would-be thief to continuously operate the combination lock until he happened upon the desired combination.

In accordance with the present invention, an anti-theft system has been developed wherein the problems and disadvantages of prior art devices have been eliminated and reduced.

In accordance with one aspect of the invention, a security system is provided to prevent the unauthorized operation of a lock mechanism and includes an encoder located for entering of a code sequence therein by an operator. A decoder is remotely disposed in a secure location adjacent the lock mechanism and is responsive to the encoder for generating an electrical energizing signal only upon detection of a predetermined code entered in the encoder. Circuitry operates the lock mechanism only upon generation of the energizing signal.

In accordance with a more specific aspect of the invention, a security system is disclosed for preventing the unauthorized use of a vehicle which includes an encoder accessible to the vehicle operator for manual entrance of a code sequence therein and for generation of electrical representations of the entered code sequence. A decoder is connected to the encoder and is located in a position on the vehicle of difficult accessibility. The decoder generates an energizing signal only when electrical representations are received according to a predetermined code sequence. Structure is provided to normally prevent movement of the vehicle until reception of the energizing signal.

In a more specific aspect of the invention, a security system for the vehicle includes an encoder mechanism mountable in the passenger compartment of the vehicle and including switches for having a plurality of codes sequentially entered therein. A decoder is responsive to the code entered within the switches and is located in an area of the vehicle of difficult accessibility. Structure is operable in dependence upon the decoder circuitry for locking the drive train of the vehicle until a predetermined code is entered into the encoder. Circuitry is also provided to prevent ignition of the vehicle motor until the predetermined code is entered into the encoder mechanism. Upon starting of the vehicle motor, the encoder mechanism is reset to zero.

In accordance with yet another aspect of the invention, an encoder panel is mounted in the passenger compartment of the vehicle and includes a plurality of switches thereon for entry of a predetermined code. Decoder circuitry is responsive to the output of the encoder panel, and is located within an area of the vehicle of difficult accessibility, such as within the transmission housing. Circuitry is operable in dependence upon the decoder to lock the drive train of the vehicle until a predetermined code is entered into the encoder. Additionally, ignition of the motor of the vehicle is prevented until the predetermined code is entered into the encoder. Circuitry is also provided to enable the bypassing of the decoding circuitry for a predetermined number of times to enable parking of the vehicle in a parking lot or the like.

For a more complete understanding of the invention, and for further objects and advantages thereof, reference is now made to the following description taken in conjunction with the following drawings, in which:

FIG. 1 diagrammatically illustrates one embodiment of the invention;

Figure 1:
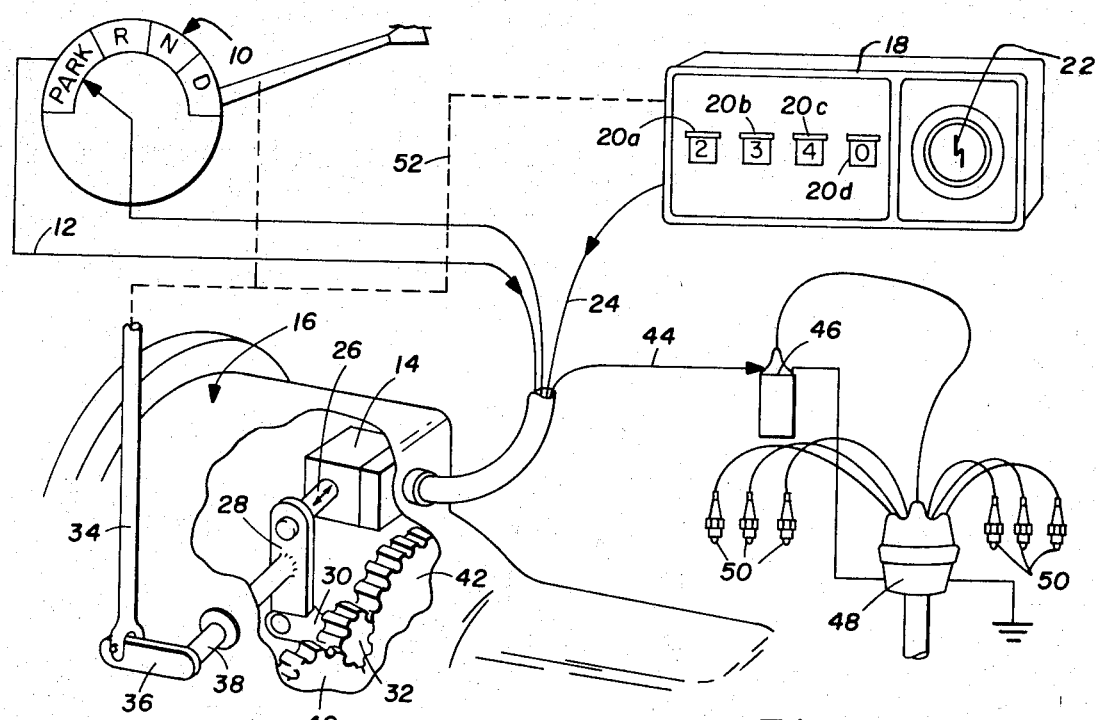

Referring to FIG. 1, a diagrammatic illustration of a first embodiment of the invention is shown. A conventional vehicle automatic transmission gearshift is designated generally by the numeral 10. A conductor 12 extends from the gearshift 10 to logic decoder circuitry encapsulated within a package 14. Electrical power is supplied to circuitry within the package 14 via conductor 12 when the gearshift 10 is placed in the PARK position. The package 14 is located in a secure area within the transmission housing 16 of the vehicle.

An encoder assembly 18 is located on the dashboard of the vehicle and includes a plurality of thumbwheel switches 20a–d, manual operation of which enables a code to be entered within the encoder assembly 18. An automobile key switch 22, or any other suitable electrical switch, is also located within the encoder assembly 18. A multi-conductor cable 24 connects the encoder assembly 18 with the decoder package 14 in order to provide a binary coded signal to package 14 which is representative of the code manually entered into the encoder assembly 18. Circuitry, to be later described, within the decoder package 14 controls the operation of a solenoid shaft 26 between an extended and a retracted position.

In the extended position of the shaft 26, the end of the shaft 26 extends through an aperture in the upper end of a member 28. The lower end of member 28 is pivotally connected to an extension 30 connected to a locking gear 32. A linkage 34 is connected to the gearshift 10 and is pivotally connected at one end to an extension 36 of a shaft 38. Shaft 38 is journaled through the sidewall of the transmission 16 and is connected to the center of the member 28. In the illustrated position, the locking gear 32 is wedged between transmission gears 40 and 42, thereby preventing operation of the drive train of the automobile. The shaft 26 in its extended position locks the member 28 against movement so that the locking gear 32 may not be removed from its locking position between the gears 40 and 42. When the decoder assembly 14 receives the desired predetermined combination entered in the encoder assembly 18, the circuitry within the decoder assembly retracts the shaft 26 to enable rotation of the member 28. The linkage 34 is moved upwardly when the automobile gearshift is moved from the PARK position, and the member 28 is then pivoted by the shaft 38 to retract the gear 32 from its locking position between the transmission gears 40 and 42. The transmission 16 may then be operated in the normal manner to enable movement of the car.

The decoder assembly 14 also controls the power fed via conductor 44 to the automobile ignition system including the coil 46, distributor 48 and the vehicle spark plugs 50. As will be later described, electrical power is not fed via conductor 44 until the proper combination is entered in the encoder assembly 18 and detected by the decoder assembly package 14. The gearshift selector is connected to a mechanical linkage 52 which resets the four digit code entered into the encoder assembly 18 when the gearshift assembly is moved from the PARK position.

Figure 2:
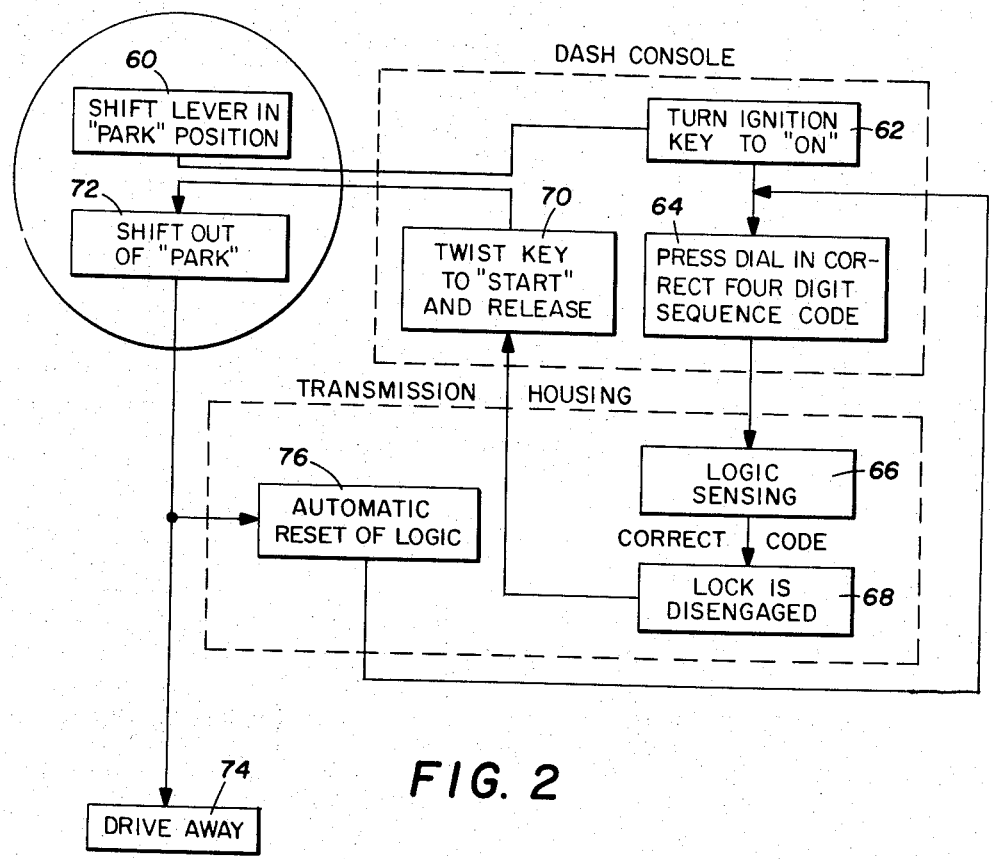
FIG. 2 is a functional diagram of various steps of operation of the system shown in FIG. 1.

FIG. 2 is a functional diagram which explains the operation of the system shown in FIG. 1. Assuming that the vehicle is at rest with the motor off, the gearshift lever is moved to the PARK position in step 60 and the ignition key, or any other suitable electrical switch, is inserted and turned to the ON position in step 62. A four digit code is then manually entered to the encoder assembly 18 as shown in step 64. The four digit code is sensed by the logic contained in the decoder package 14 in step 66. If the correct four digit code has been entered, the shaft 26 is retracted from the aperture in the member 28 as shown in step 68.

Additionally, if the correct code has been entered into the encoder assembly 18, power is supplied to the ignition system of the vehicle. Therefore, if the key is twisted to START at step 70, the vehicle engine is started. The gearshift lever is shifted out of PARK at step 72 and the car may be conventionally operated and driven away as shown in step 74. When the gearshift lever is shifted out of PARK position, the four digit code entered in the encoder assembly 18 is reset to zero at 76 due to the linkage 52. When the driver reaches his destination and brings the vehicle to a stop, the driver must place the gearshift selector into the PARK position before the engine may be stopped. The enable signal to the decoder circuitry is not lost until the switch 22 is turned off. This prevents having to re-enter the code into the encoder in case of engine failure. When the ignition switch is then turned to the OFF position, the decoder package senses the zero entry of the encoder assembly 18 and the solenoid shaft 26 is extended to fit through the aperture in the upper portion of the member 28 to lock the locking gear 32 in place between gears 40 and 42. The vehicle may then not be started or moved until the previously described sequence is again repeated.

Assuming that a would-be thief is equipped with a master key, or a duplicate key, or that the vehicle key was unintentionally left in the car, the vehicle engine cannot be started and the gearshift selector may not be moved out of PARK until the proper coded sequence is manually entered into the encoder assembly 18. Due to the fact that the single predetermined code for operation of the vehicle is made up of four digits, a total of 9999 combinations may be entered into the encoder. A would-be thief would then have to manually enter a large number of codes until he stumbled onto the correct combination in order to overcome the safety features of the present invention.

In case the would-be thief attempted to start the vehicle by jumpering the ignition system with attachment of a jumper wire between the vehicle battery and the ignition system of the vehicle, the thief would not be able to move the car even though the engine was started. This is because of the locking feature provided by the decoder package 14 and the shaft 26 which prevents movement of the transmission until the locking mechanism is removed. Due to the fact that the decoder package 14 is located in a very secure place, the would-be thief would be required to physically remove and enter the transmission of the vehicle and disassemble the locking structure of the system before physically driving the vehicle off.

It will be understood that other secure locations are available for the decoder package of the present invention, such as in various locations underneath the car in the drive train of the vehicle or in the vehicle motor. If desired, alarms may be energized by invasion of the decoder package. The locking portion of the decoder package could be utilized to lock portions of the vehicle drive train other than the transmission. Although the invention has been disclosed with respect to use with an automatic transmission, it will be understood that the system could also be utilized with a standard transmission.

In some instances, it will be desirable to provide an ignition key system wherein the key may be removed without rendering the ignition switch inoperative. This would require the use of conventional vehicle switch ignition having an ON and a LOCK position. The car may then be left in a parking lot and the parking attendant may record the combination required to start the car. The automobile owner may then take his key with him and allow the parking lot attendant to move the car if it is required. Even if the parking lot attendant passes the vehicle code combination on to a thief, the car thief will then require either a master key or ignition jumpering equipment before being able to start and drive the vehicle away.

Figure 3:
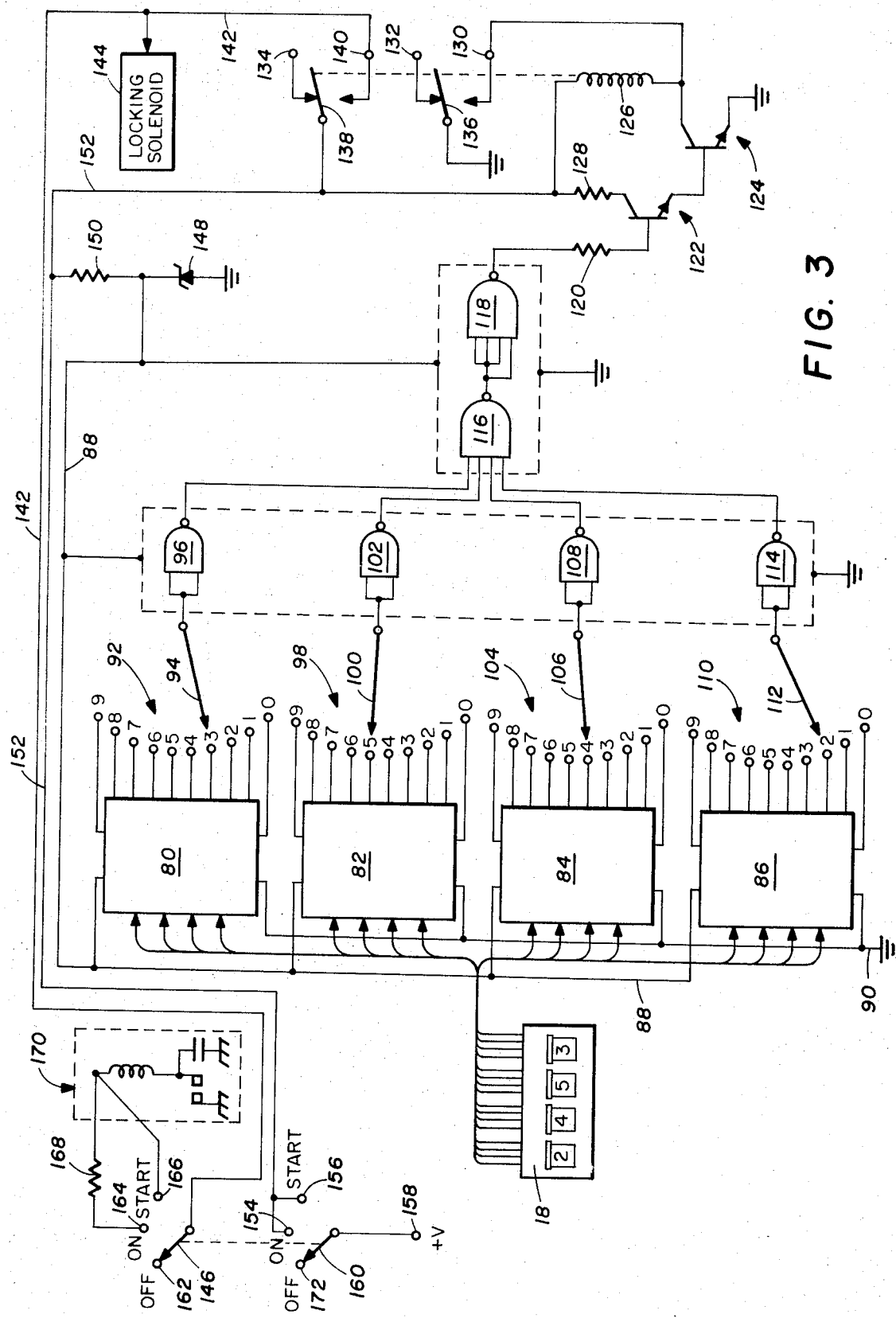
FIG. 3 is a detailed schematic of the system shown in FIG. 1.

FIG. 3 illustrates in schematic detail the circuitry for the system shown in FIG. 1. Encoder assembly 18 may comprise any suitable code entry system, such as the illustrated series of thumbwheel switches, or alternatively rotary switches, pushbutton switches or capacitive actuated button switches. A suitable thumbwheel switch system providing 9999 possible input combinations is manufactured and sold under the tradename "-Mini-lever" by the Digitran Company, a division of Becton, Dickinson & Company. While only four thumbwheel switches have been illustrated in the encoder assembly 18, it will be understood that more or less switches could be utilized for various desired system capability.

The encoder assembly 18 generates four channels of binary coded decimal outputs each providing an electrical indication of the position of the respective thumbwheel switch. The first channel of binary coded decimal outputs is input to a binary coded decimal-to-decimal decoder circuit 80, while the remaining three output channels from the encoder assembly 18 are fed respectively to decimal decoder circuits 82, 84 and 86. Decoder circuits 80–86 may comprise any suitable binary coded decimal-to-decimal decoding circuits such as the SN7442 circuit packages manufactured and sold by Texas Instruments Incorporated. A positive voltage is supplied to each of the circuits 80–86 from a conductor 88, and common terminals of each of the circuits 80–86 are grounded via a conductor 90. Decoder circuit 80 includes ten output terminals designated generally by the numeral 92, each terminal representing a different digit from 0-9.

A wire connection 94 is attached between a selected one of the ten terminals of the decoder circuit 80 and the input of an inverter circuit 96. Similarly, the decoder circuit 82 includes 10 output terminals designated generally by the numeral 98, each terminal representing a different digit between 0-9. A conductor 100 connects a selected one of the terminals 98 to the input of an inverter 102. The decoder circuit 84 also includes 10 output terminals designated generally by the numeral 104, a selected one of the terminals being connected by a conductor 106 to the input of an inverter 108. Likewise, the decoder circuit 86 includes ten output terminals 110, a selected one of which is wired by a conductor 112 to the input of an inverter 114.

The particular output terminal chosen for each one of the decoder circuits 80–86 determines the predetermined code which is necessary to operate the vehicle. The connectors 94, 100, 106 and 112 may comprise wires plugged into a printed circuit board to enable changing of the combination for a particular vehicle, or alternatively may be soldered into place. Each of the thumbwheel switches of the encoder has a possibility of 10 inputs 0–9. Thus, the number of input combinations into the encoder is $10^n$, where $n$ is the number of encoder channels. The four channel encoder thus provides 10,000 input combinations, which when converted to binary coded decimal results in a possibility of sixteen combinations for each channel. The output combinations for the encoder are $16^n$, where $n$ is the number of encoder channels. With four channels the output combinations are thus 65,536, but the effective output of the encoder is 10,000 combinations due to the limited input.

Thus, as the zero input cannot be used with the present system, any one of 9,999 possible combinations may be utilized to control the operation of a particular vehicle. The output of the decoder circuit 86 comprises the thousandth digit of the predetermined combination, the chosen output of the decoder circuit 84 comprises the hundredth digit of the predetermined combination, the chosen output of the decoder circuit 82 comprises the 10 digit for the predetermined combination and the output of the decoder circuit 80 comprises the units digit of the predetermined combination for the vehicle.

In the particular system illustrated in FIG. 3, the predetermined code for operation of the vehicle is 2453, however, it will be understood that this code is chosen only for purposes of illustration in that any number between zero and 9,999 could be chosen for operation of the vehicle.

Inverters 96, 102, 108 and 114 may comprise, for instance, the inverter package SN7400 manufactured and sold by Texas Instruments Incorporated. The outputs of each of the inverters 96, 102, 108 and 114 are fed into a NAND gate 116. The output of the NAND gate 116 is tied to the inputs of an inverter circuit 118, the output of which is fed through a resistance 120 to the base of a transistor 122. A suitable circuit for use as the NAND gate 116 for the inverter 118 is the NAND gate package SN7420 manufactured and sold by Texas Instruments Incorporated.

The emitter of transistor 122 is connected to the base of a transistor 124, the emitter of which is grounded. The collector of transistor 124 is connected to a relay coil 126. The collector of transistor 122 is connected through a resistance 128 to a terminal of the coil 126. Transistors 122 and 124 are thus connected in a Darlington configuration and act as a driver circuit for the relay circuit of the invention.

The collector of transistor 124 is connected to the terminal 130 of a double pole, double throw relay. Terminals 132 and 134 of the relay are left unconnected. The movable relay arm 136 is movable between contact with terminals 130 and 132 and is connected to circuit ground. A movable relay arm 138 is movable into and out of contact with relay terminal 134 and with the fourth relay terminal 140. Relay arm 138 is connected through resistor 128 to the collector of the transistor 122. Relay terminal 140 is connected via conductor 142 to a locking solenoid 144 which controls the transmission locking shaft 26 previously described in FIG. 1. Conductor 142 also connects to a movable switch arm 146 of a double pole switch controlled by the automobile ignition key.

Conductor 88 is connected to a cathode of a Zener diode 148 connected to circuit ground. Diode 148 is also connected through a resistance 150 to conductor 152 which connects to terminals 154 and 156 of the double pole switch controlled by the automobile ignition key. A source of positive voltage is applied to terminal 158 which in turn is connected to a movable switch arm 160 which is controlled by operation of the automobile ignition key. When switch arm 160 is closed against ON terminal 154, positive voltage is applied to conductor 152 in order to supply voltage to transistors 122 and 124. Voltage of a reduced magnitude is also then applied via conductor 88 to the remainder of the logic circuitry previously described.

The double pole ignition switch includes switch arms 146 and 160, both of which are controlled by operation of the automobile vehicle ignition key. Switch arm 146 is movable between an OFF terminal 162, ON terminal 164 and a START terminal 166. ON terminal 164 is connected through a resistance 168 to the conventional vehicle ignition system identified generally by numeral 170. The START terminal 166 is directly connected to the ignition system 170 for initiating operation of the vehicle motor. Switch arm 160 is movable between an OFF terminal 172, ON terminal 154 and a START terminal 156.

Operation of the system shown in FIG. 3 is similar to the operation functionally described in FIG. 2. Assuming the car is at rest and the automobile engine shut off, the gearshift lever of the automobile is moved to the PARK position. The transmission lock mechanism shown in FIG. 1 thus locks the transmission of the car against movement, and the solenoid shaft 26 prevents removal of the gearshift lever from the PARK position. The locking solenoid 144 is deenergized to maintain the shaft 26 in the extended position to prevent movement of the car.

If an authorized operator of the vehicle desires to start the car, the ignition key is inserted and is turned to the ON position. This moves the switch arms 146 and 160 to their respective ON positions against terminals 164 and 154. Positive voltage is then applied via conductor 142 to the voltage regulating circuit comprising diode 148 and resistor 150 to supply bias voltage to the logic circuitry to the invention. Voltage is also applied via conductor 152 to the switch arm 138 and to the relay coil 126. However, as relay coil 126 is connected to the open circuit terminal 130, the coil 126 is not energized in this instance.

A code is then manually entered into the encoder assembly 18. If the predetermined code for operation of a particular vehicle is properly entered into the encoder assembly, the decoder circuits 80–86 each generates a logic indication to the inverters 96, 102, 108 and 114. If the predetermined combination is received, the NAND gate 116 and the inverter 118 operate to energize transistors 112 and 124. Energization of the transistor Darlington configuration creates current flow through the relay coil 126 to operate the double pole, double throw relay including switch arms 136 and 138.

Upon movement of the switch arm 138 into contact with terminal 140, voltage is applied via conductor 152, the switch arm 138 and to the conductor 142 for energization of the locking solenoid 144. The solenoid shaft 26, shown in FIG. 1, is then retracted to unlock the locking gear 32. Voltage is also applied via lead 142 to the switch arm 146. Voltage is then applied through the switch arm 146 to the terminal 164 and through the resistor 168 to the ignition system 170 of the automobile.

The automobile ignition switch may then be turned to the START position to directly apply voltage to the ignition system 170 to start the automobile motor. The switch is then moved back to the ON position. After starting of the vehicle motor, the gearshift lever may be moved from the PARK position to remove the locking gear 32 from engagement with gears 40 and 42 within the automobile transmission. The vehicle may then be operated in the conventional manner and driven away. Movement of the gearshift lever from the PARK position mechanically resets the combination set within the encoder assembly 18 to zero. The relay coil 126 is latched into an energized position due to the closing of the switch arm 136 with terminal 130. Thus, resetting of the encoder assembly 18 to zero turns transistors 122 and 124 off, but does not deenergize the relay coil 126. However, when the automobile is stopped, the ignition switch is turned to the OFF position, and the transmission placed in the PARK position. Turning the switch to OFF removes the positive voltage from the conductor 152, deenergizing the relay 126 to thereby deenergize solenoid 144 to again lock the transmission of the car.

It will be understood that if an unauthorized person attempts to operate the vehicle, that he will not be able to start the vehicle motor or to move the vehicle until the proper code is entered into the encoder assembly 18. Even if the unauthorized operator jumpers the ignition system and starts the motor of the car, he will not be able to move the gearshift lever from the PARK position and will not be able to tow the car in the conventional manner due to the locked transmission. Due to the fact that the decoder circuitry of the invention is located in an area of difficult accessibility, considerable time and delay will occur if the unauthorized operator attempts to move or destroy the decoder mechanism. It is believed that such delay will be adequate to discourage theft of an automobile equipped with the present system, and in many instances will prove to be an absolute deterrent.

In some instances, it may be desirable to eliminate the automatic resetting of the encoder assembly 18 by movement of the gearshift lever from the PARK position. In this instance, after the car engine is started and the automobile operated, the operator of the car could then manually reset the encoder assembly to zero to reset the system.

Figure 4:
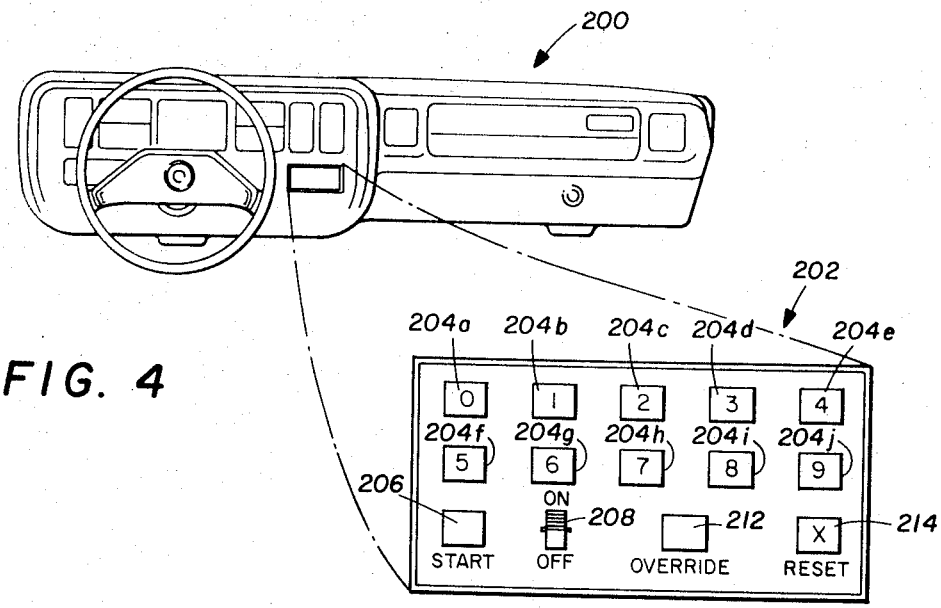
FIG. 4 is an exploded view of the encoder panel for use on the preferred embodiment of the invention.

FIGS. 4–7 illustrate in detail the preferred embodiment of the invention which includes circuitry to prevent a would-be thief from attempting to overcome the system by trial and error operation of the encoder assembly. Another advantage of this embodiment is that the code entered into the encoder assembly is not visible to an onlooker, as is the case in the first embodiment previously described. Referring to FIG. 4, the dashboard of a typical vehicle is designated generally by the numeral 200. An encoder assembly 202, illustrated in an exploded and enlarged manner, includes ten pushbutton switches 204a–j. The desired combination code may be entered by sequentially pressing selected ones of switches 204a–j. A START button switch 206 may also be pushed for starting of the vehicle engine after entry of the desired code. A rocker switch 208 may be moved between ON and OFF positions in order to initially supply power to the theft prevention system. An OVERRIDE button switch 212 is mounted in the encoder assembly 202 which when enabled by entry of the proper code into the encoder assembly will enable a parking lot attendant or the like to start the car for a predetermined number of times without requiring the input of the combination into the encoder assembly. A RESET pushbutton switch 214 is provided to reset the system in case an erroneous code is accidentally entered into the system, or to eliminate the remaining number of free starts resulting from the depression of the OVERRIDE button switch 212.

Figure 5:
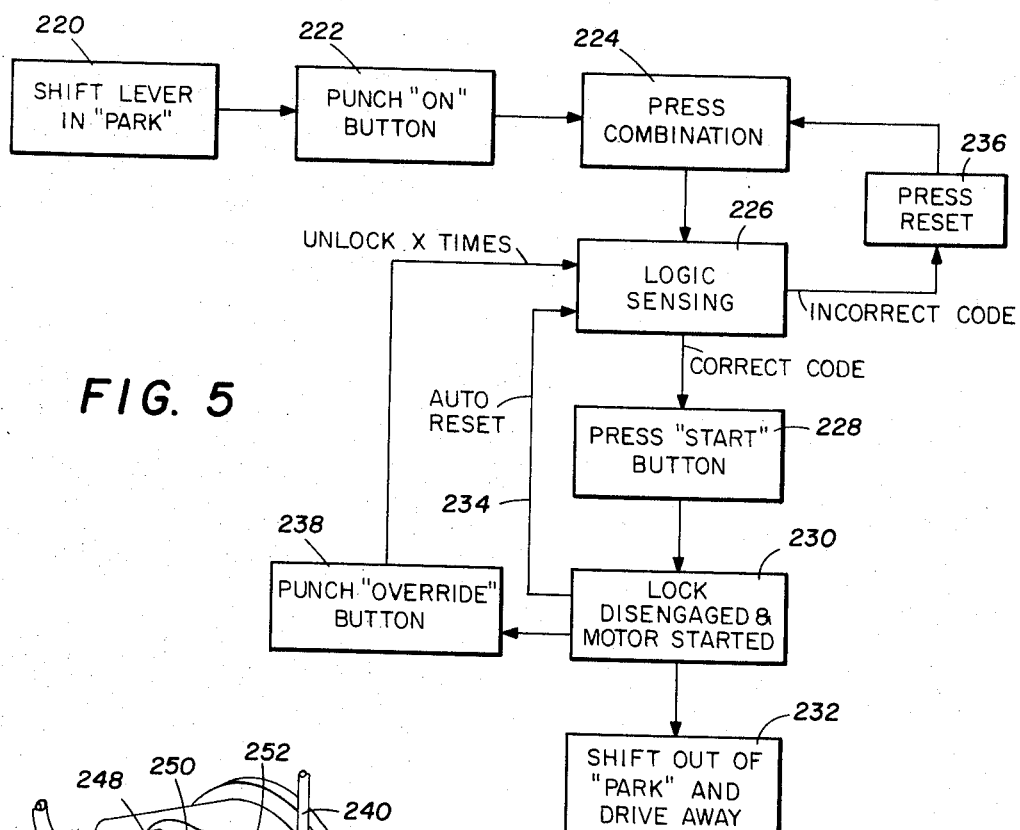
FIG. 5 is a functional diagram of the various operational steps of the preferred embodiment of the invention.

FIG. 5 is a functional diagram illustrating various aspects of the operation of the preferred embodiment of the present system. It will be assumed that the vehicle is at rest with the motor shut off and it is desired to operate the car. The shift lever is positioned in PARK at step 220, and the drive train of the automobile is locked in a manner similar to that previously described, as by locking up the vehicle transmission. The rocker switch 208 is then placed in the ON position at step 222 and four of the button switches 204a–j are sequentially pressed at step 224. The code entered into the encoder assembly 202 is sensed at a remote and relatively inaccessible location on the vehicle at step 226. If the correct code has been entered, depression of the start button 206 at step 228 will unlock the drive train of the automobile and start the automobile motor at step 230. The automobile may then be shifted out of PARK and driven away at step 232.

When the drive train of the automobile is unlocked and the motor started, the input code sensed by the logic is automatically reset to zero by function 234. In case of accidental depression of an erroneous combination into the encoder assembly 202, the RESET button 214 may be depressed at step 236 in order to enable another try at starting of the vehicle. In case it is desired to unlock the present system for a predetermined number of times, as in the case when it is desired to let an automobile attendant move the car a number of times, the OVERRIDE button 212 is pushed after the proper code has been entered as shown in function 238, in order to enable the attendant to move the car. The number of times set into the system for which the OVERRIDE button operates may be selectively determined and varied.

Figure 6:
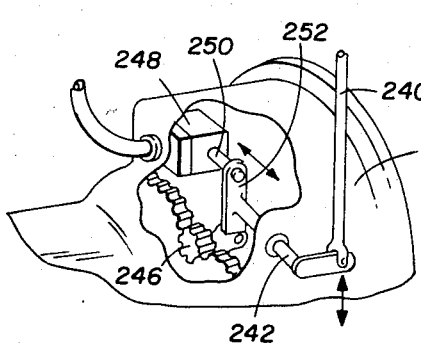
FIG. 6 is a somewhat diagrammatic illustration of the locking mechanism for use with the preferred system.

FIG. 6 illustrates a suitable device for locking the drive train of an automobile in accordance with the second embodiment of the invention. A rod linkage 240 is controlled by the position of the gearshift lever of the automobile. Downward movement of the linkage 240 causes rotation of a shaft 242 extending through the sidewall of the automobile transmission 244. Shaft 242 causes a locking gear 246 to be inserted between gears of the transmission to prevent movement of the vehicle. The decoder circuitry of the invention is contained in a box 248 which is hermetically sealed to withstand the temperatures and fluids with the transmission.

A solenoid shaft 250 is movable into and out of engagement with an aperture in member 252 connected to the locking gear 246. When the solenoid shaft is retracted, the locking gear 246 may be removed from the transmission gears, while when the solenoid shaft 250 is extended through the aperture within the member 252, the locking gear 246 cannot be removed from its locking position. It will be understood that similar locking devices could be utilized to prevent movement of the drive train of the car, such as for example a lock upon the universal joint or the like. The decoder box 248 is located in an area of difficult accessibility in order to reduce the chances of tampering with the mechanism thereof.

Figure 7A:
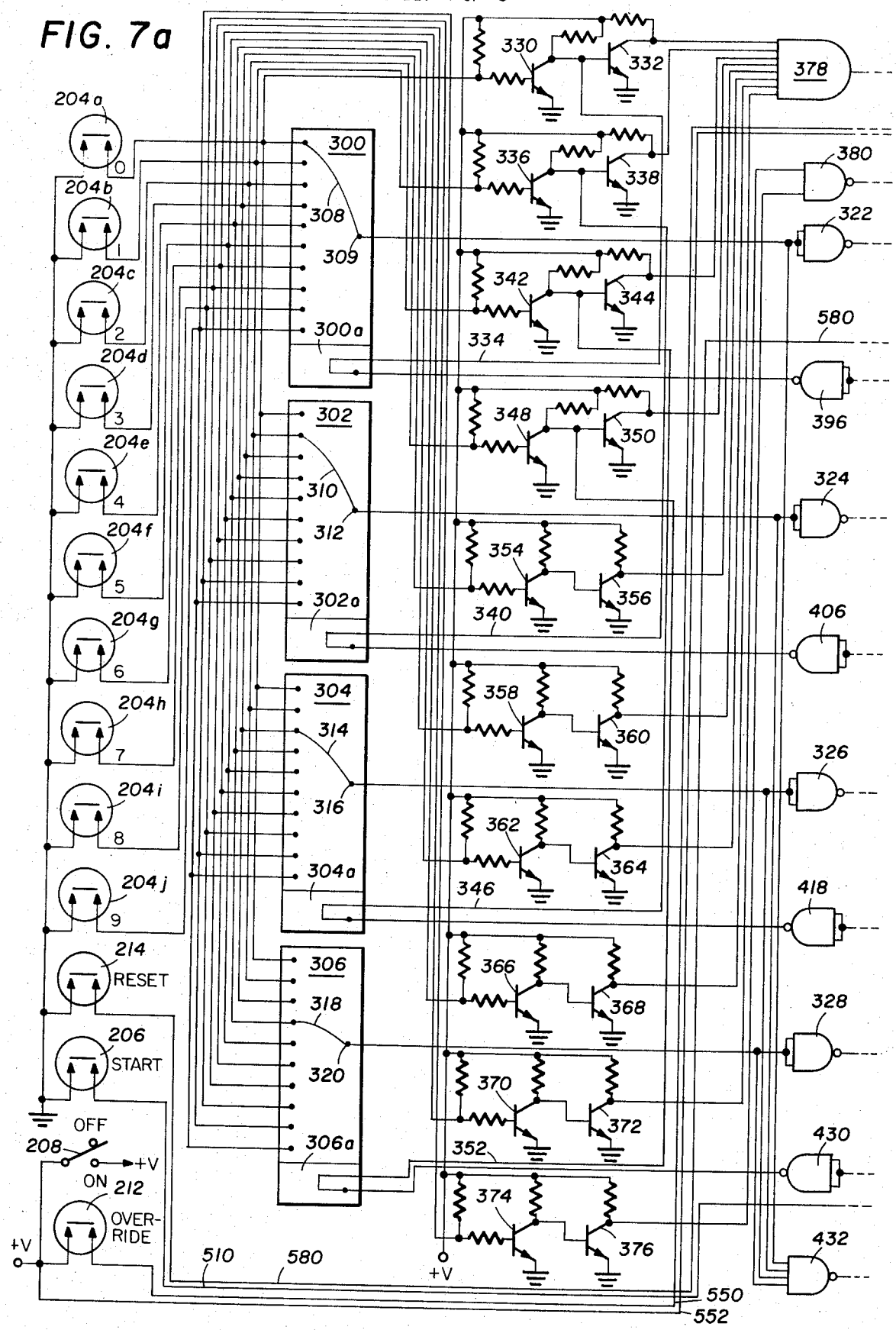
FIGS. 7a–c are schematic diagrams of the preferred embodiment of the invention.
Figure 7B:
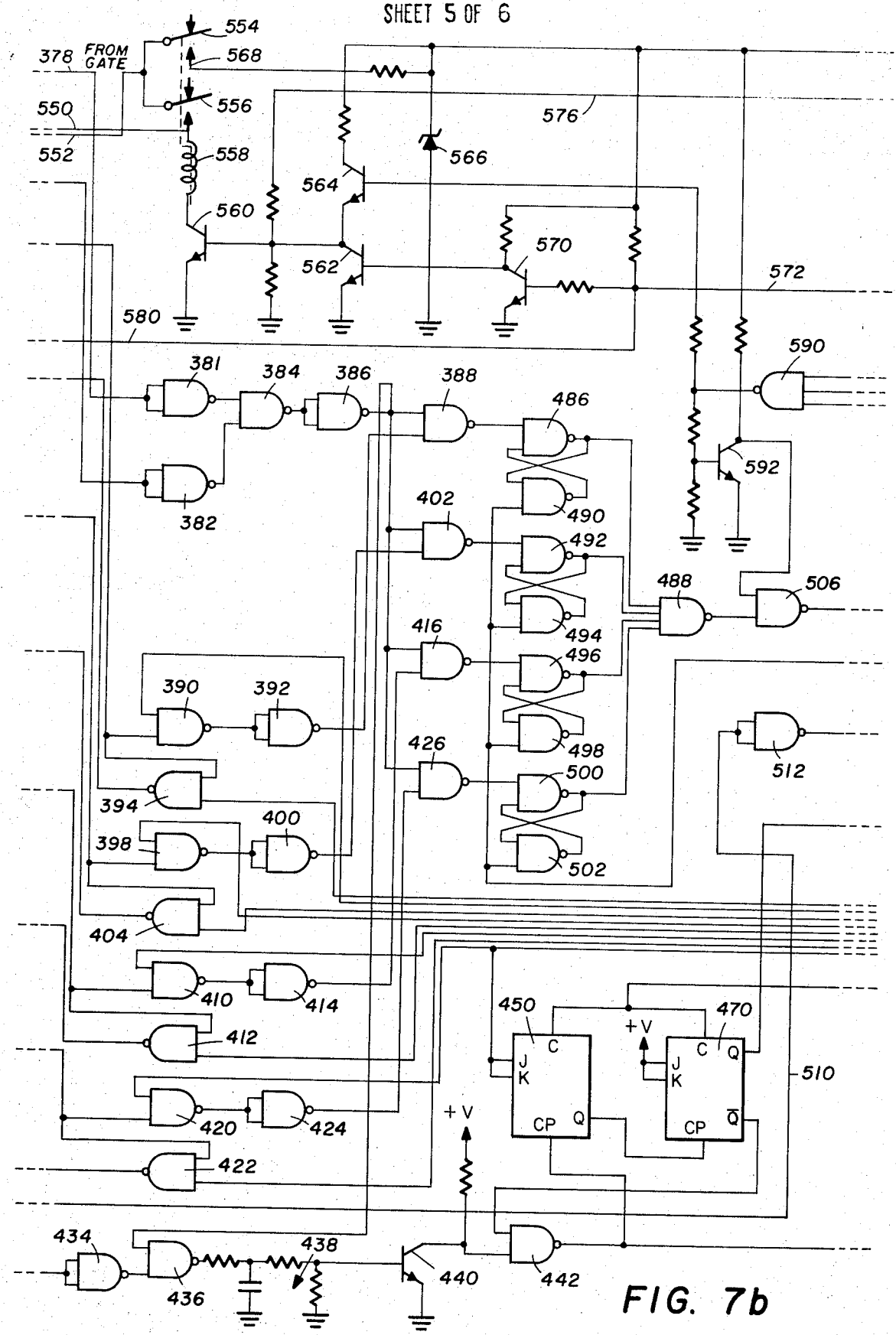
Figure 7C:
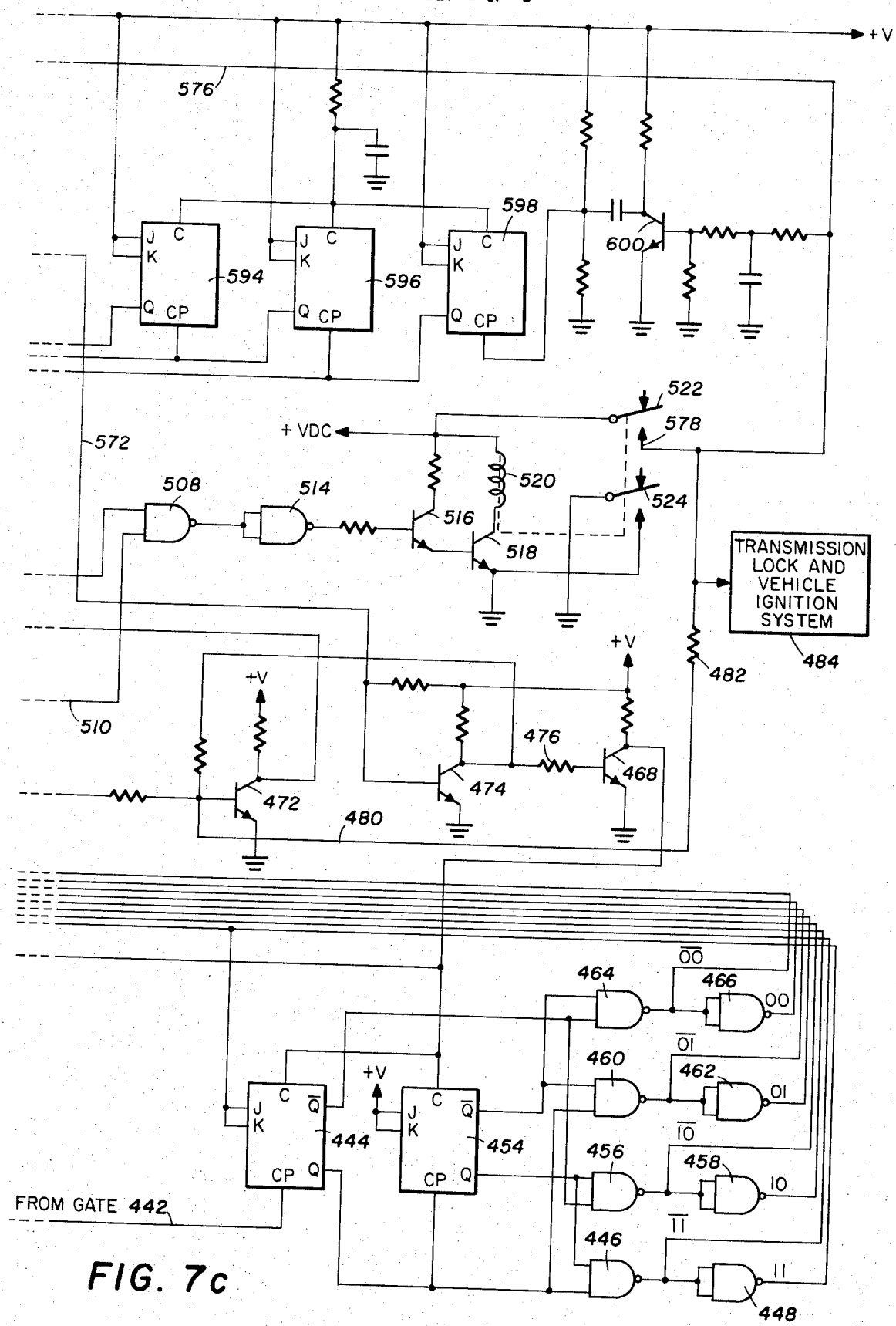

FIGS. 7a–c illustrate in schematic detail the preferred embodiment of the invention. For ease of reading, the FIGURES should be placed side-by-side and the various connections matched up with one another.

Pushbuttons 204a–j are each connected to input terminals of four code combination panels 300, 302, 304 and 306. A connection is then made between a selected on of the 10 inputs of each of the connection panels and a single output terminal thereof. For instance, a connection 308 extends from a terminal connected to pushbutton 204a corresponding to the numeral 0 and to the output terminal 309. Likewise, a connection 310 is connected to the terminal connected to a pushbutton 204b corresponding to the numeral 1 and is also connected to an output terminal 312. Connection 314 is attached to the terminal connected to the pushbutton 204c representative of the numeral 2 and is also attached to an output terminal 316. In the combination panel 306, a connection 318 is connected to a terminal connected to the button switch 204d representative of the numeral 3 and is also connected to an output terminal 320. The second terminals of each of the buttons 204a–j are connected to circuit ground.

The preselected code for this particular system is thus 0123. By varying the connections 308, 310, 314 and 318, this combination may be selectively changed. In some instances, it will be desirable that the connection panels 300, 302, 304 and 306 comprise printed circuit boards so that the connectors 308, 310, 324 and 318 may be selectively varied. In other environments, it will be desirable to hardwire the connections. An output terminal 309 is connected to the inputs of an inverter 322, and the output terminal 312 is connected to the inputs of an inverter 324. Likewise, the output terminal 316 is connected to the inputs of an inverter 326, while the output terminal 320 is connected to the inputs of an inverter 328.

Each of the combination boards 300–306 includes second stages designated as 300a, 302a, 304a, and 306a. The connections made in the second stages of the combination panels determine the sequence with which the preselected code numbers must be punched in order to operate the system. Thus, not only do the predetermined numbers have to be punched into the encoder assembly 202, but the numbers must be punched in the right sequence in order to operate the vehicle.

A terminal of each of the button switches 204a–j is also connected to a respective dual amplifier stage. For example, button switch 204a is connected to the base of a transistor 330 which is coupled to a transistor 332. A coded wire connection 334 connects the combination panel 300a to the base of the transistor 322. Button switch 204b is connected to the base of a transistor 336, the collector of which is coupled to the base of a transistor 338. The secondary combination panel 302a is connected via lead 340 to the base of the transistor 338. Button switch 204c is coupled to the base of a transistor 342 which is in turn connected to a base of a transistor 344. The secondary combination panel 304a is connected by a conductor 346 to the base of the transistor 344. Button switch 204d is coupled to the base of a transistor 348 which is connected in turn to the transistor 350. The secondary combination panel 306a is connected by way of connector 352 to the base of the transistor 350. The connection of the combination panels shown in FIG. 7a thus requires that a combination of 0123 be sequentially pushed into the encoder assembly 202 in order to actuate the vehicle. It will be understood that this sequence of numbers will be varied by merely varying the connections in the combination panels as previously described.

Button switch 204e is coupled to series connected transistors 354 and 356, and button switch 204f is coupled to series connected transistors 358 and 360. Likewise, button switch 204g is coupled to transistors 362 and 364. Pushbutton switch 204h is coupled to transistors 366 and 368, while button switch 204i is coupled to transistors 370 and 372. Pushbutton 204j representing the numeral 9 is coupled to the base of transistor 374, the collector of which is connected to the base of transistor 376.

The collectors of transistors 332, 338, 344, 350, 356, 360, 364 and 368 are directly connected to the input of a NAND gate 378. The collectors of transistors 372 and 376 are connected to the inputs of a NAND gate 380. A suitable NAND gate for use as gate 378 is the SN7430 circuit manufactured and sold by Texas Instruments Incorporated.

The output from gate 378 is fed to the inputs of inverter 381 (FIG. 7b), while the output of gate 380 is fed to an inverter 382. The outputs of the inverters 381 and 382 are fed to a NAND gate 384, the output of which is fed through an inverter 386 to one input of a NAND gate 388.

The output of gate 322 is connected to an input of a NAND gate 390 which in turn is coupled through an inverter 392 to the second input of the NAND gate 388. The output of gate 322 is also connected to an input of a NAND gate 394, the output of which is connected through an inverter 396 and through the secondary combination panel 300a to the base of the transistor 332.

The output of the inverter 324 is connected to the input of a NAND gate 398 which is coupled through an inverter 400 to an input of a NAND gate 402. The output of gate 324 is also connected to an input of a NAND gate 404, the output of which is connected through an inverter 406 and through the secondary combination panel 302a to the base of the transistor 338. The output of the inverter 326 is connected to the inputs of NAND gates 410 and 412. The output of gate 410 is connected through an inverter 414 to an input of a NAND gate 416. The output of gate 412 is connected through an inverter 418 and through the secondary combination panel 304a to the base of transistor 344. The output of the inverter 328 is connected to the inputs of NAND gates 420 and 422.

The output of gate 420 is coupled through an inverter 424 to the input of a NAND gate 426. The second inputs of each of the NAND gates 388, 402, 416 and 426 are commonly connected. The output of NAND gate 422 is connected through an inverter and through the secondary combination panel 306a to the base of the transistor 350. The inputs to the inverters 322, 324, 326 and 328 are connected to the input of a NAND gate 432, the output of which is coupled through an inverter 434 to a NAND gate 436. The second input of the gate 436 is connected to the commonly connected inputs of gates 388, 402, 416 and 426.

The output of the gate 436 is coupled through a filter network 438 to the base of a transistor 440. As will be later described in detail, transistor 440 is turned on when any button and sequence is pushed. The collector of the transistor 440 is fed to an input of a NAND gate 442, the output of which is connected to the CP input of a flip-flop circuit 444. Flip-flop 444 and all other flip-flops hereafter described, may comprise for instance the dual flip-flop circuits SN5473 manufactured and sold by Texas Instruments Incorporated.

The Q output of flip-flop 444 is connected to an input of a NAND gate 446, the output of which is fed through an inverter 448 to the JK input of the flip-flop 444, to the JK input of a flip-flop 450 and to the second input of the NAND gate 420. The output of gate 446 is also fed to the second input of gate 422. The Q output of flip-flop circuit 454 is connected to inputs of a gate 456 and to the second input of the gate 446. The output of gate 456 is fed through an inverter 458 to the input of a gate 410. The output of gate 446 is fed to the second input of gate 422. The $\bar{Q}$ output of the flip-flop 454 is fed to the input of NAND gate 460, the output of which is fed to an inverter 462 and also to the second input of the gate 404.

The output of the inverter 462 is fed to the second input of the gate 398. The $\bar{Q}$ outputs of both flip-flop circuits 444 and 454 are fed to a NAND gate 464, the output of which is fed through an inverter 466 to the second input of gate 390. The output of gate 464 is also fed to the second input of gate 394. The C outputs of flip-flop circuits 444 and 454 are connected to the collector of transistor 468. The C inputs of flip-flops 444 and 454 are also connected to the C inputs of the flip-flop 450 and of a fourth flip-flop circuit 470. The Q output of flip-flop 470 is fed through the base of a transistor 472.

The base of transistor 472 is coupled to the collector of a transistor 474 and through a resistor 476 to the base of transistor 468. The base of transistor 472 is also connected via conductor 480 and through resistor 482 to the transmission lock and vehicle ignition system 484. System 484 comprises the similar type system as that described with respect to FIG. 1.

The output of NAND gate 388 is connected to an input of a NAND gate 486, the output of which is connected to the master control gate 488. Gate 486 is interconnected with a NAND gate 490. The output of gate 404 is connected to an input of gate 492, the output of which is also coupled to gate 488. A NAND gate 494 is interconnected with gate 492. The output of gate 416 is connected to a NAND gate 496, the output of which is connected to the master control gate 488. Gate 496 is interconnected with gate 498. The output of gate 426 is connected to a NAND gate 500, the output of which is fed to the master control gate 488. Gate 500 is interconnected with gate 502.

Inputs of gates 490, 494, 498 and 502 are commonly connected and are connected to the collector of transistor 472. The output of gate 488 is fed to an input of a NAND gate 506, the output of which is applied to a NAND gate 508. A terminal of the START pushbutton 206 is applied via lead 510 and through an inverter 512 to the second input of the NAND gate 508. The output of gate 508 is applied through an inverter 514 to the base of a transistor 516. The emitter of transistor 516 is connected to the base of a transistor 518, the collector of which is connected to a relay coil 520. Relay coil 520 controls the operation of relay switch arms 522 and 524. In the normally open condition of the switch arms 522 and 524, no current is applied to the transmission lock and vehicle ignition system 484, and thus the engine of the vehicle is not energized and the car may not be moved.

Both terminals of the OVERRIDE pushbutton switch 212 are connected via leads 550 and 552. Lead 552 is connected to relay switch arms 554 and 556. Lead 550 is connected to one terminal of a relay coil 558. The other terminal of coil 558 is connected to the collector of transistor 560. The base of transistor 560 is connected to the collector of transistor 562 and to the emitter of the transistor 564. A Zener diode 566 is coupled across the collector of transistor 564 and circuit ground, as well as to the relay switch terminal 568. The base of transistor 562 is connected to the collector of transistor 570, the base of which is connected via lead 572 to the base of transistor 474. The bases of transistor 560 and 562 are connected via conductor 576 to a terminal 578 of the master control relay of the system. A terminal of the RESET button switch 214 is connected via lead 580 to a lead 572.

The base of transistor 564 is coupled to the output of a NAND gate 590, which may comprise, for instance, one third of a SN7410 package manufactured and sold by Texas Instruments Incorporated. The output of gate 590 is coupled to the base of a transistor 592, the collector of which is connected to an input of gate 506. The inputs to gates 590 are connected to the Q outputs of flip-flop circuits 594, 596 and 598. The CP output of flip-flop circuit 598 is coupled to the collector of a transistor 600 which in turn has a base coupled to a lead 576 through R-C circuitry.

In operation of the preferred embodiment of the circuit shown in FIGS. 7a–c, it is assumed that the vehicle is at rest with the transmission in the PARK position and with the vehicle engine cut off. The system is assumed to be reset to zero and the flip-flops 444 and 454 are properly set such that the logic input to gate 394 is 0. Therefore, the output of gate 394 is logic 1 and the output of the inverter 396 is a logic 0. If the operator of the vehicle presses the correct one of the pushbuttons 204a–j, which in this example would be pushbutton 204a, then a logic 0 would be impressed upon the input of inverter 322, thereby placing a logic 1 on an input of the NAND gate 390. The states of the flip-flops 444 and 454 provide another logic 1 to the input of gate 390, thereby providing a logic 0 output out of gate 390. A logic 1 output from the inverter 392 is then applied to an input of the NAND gate 388. Additionally, due to the fact that the correct button 204 was pressed in this time sequence, a second logic 1 is applied to gate 388. The resulting logic 0 from gate 388 latches gate 486 and 490 into a logic 1 output state, thereby entering the first correct logic 1 input into the master control gate 488.

It is important to note that upon pressing of any of the buttons 204a–j at this time, a logic 1 is generated at the output of gate 436, thereby applying a clocking pulse into the flip-flop 444. The state of the flip-flop circuit thus changes from logic 00 to logic 01, and a logic 1 is applied to an input of gate 398, which provides the correct logic to gate 398 for reception of the second input signal.

The second selected pushbutton switch is now pressed by the vehicle operator. If the correct button is pressed, which in this instance would be 204b, a logic 0 is provided to the input of inverter 324. A logic 1 has previously been provided at the input of inverter 400 and thus the input of gate 402 is provided with a logic 1. If the correct button has been pushed, a logic 1 will be applied to the other input of the gate 402, thereby latching gates 492 and 494 to provide a logic 1 output. The second coded input is then provided to the master control gate 488.

The flip-flops 444 and 454 are advanced to the second count upon the pressing of the second button, due to the fact that the logic 0 applied to gate 432 results in a 1 output, which in turn results in a logic 0 from the output of the inverter 434. A false input is then provided to the flip-flop 444 and the Q output thereof goes to logic 0. Flip-flop 454 senses the trailing edge change provided from flip-flop 444 to thereby change the Q output of flip-flop 454 to logic 1. A logic output 10 is then set into gate 132 to thereby prepare gate 416 for the reception of the third input number.

In the same manner, the third and fourth buttons pushed in this particular sequence are sensed by the decoder circuitry. If the correct last two buttons are pushed in proper sequence, logic 1 inputs are additionally applied to the input of the master control gate 488. If all four inputs to gate 488 are logic 1, the proper code has been entered and the output of gate 488 is logic 0. The output of the gate 506 is a logic 1.

Depression of the START button switch 206 then provides a logic 0 to the input of gate 512. The resulting logic 1 from the output of gate 512 provides a logic 0 at the output of gate 508 and a logic 1 at the output of the inverter 514. This output turns on the transistors 516 and 518 to energize the relay coil 520. This closes the relay switches 522 and 524 in order to supply positive voltage to the transmission lock and vehicle ignition system 484. Thus, the transmission of the vehicle is unlocked by retraction of the locking shaft in the manner previously described, and the ignition system of the car is started by the application of power thereto.

When the relay coil 520 is energized, voltage is also applied through resistor 482 to the base of transistor 472. Operation of transistor 472 unlatches the gates 486, 490, 492, 494, 496, 498, 500 and 502 in order to remove the logic 1 inputs applied to gate 488. This is the automatic reset function of the present invention which is provided so that when the vehicle motor is stopped, the system must again be actuated in order to again start the vehicle.

The flip-flop circuits 444 and 454 operate to prevent any further switching of the system until the car is unlocked and started or until the RESET button 214 is pressed. This provision eliminates a would-be thief from continuously pressing buttons until he happens upon the desired predetermined combination. This function is provided by the fact that when the fourth pushbutton switch is pressed, the logic 11 output from gate 448 is fed back to the JK input of the flip-flop 444 to prevent any further switching of the two flip-flops until the RESET button switch 214 is pressed or until the START button 206 is pressed.

If a fifth pushbutton switch is pressed without depressing the switch buttons 206 or 214, the flip-flop circuit 450 switches to provide a $\bar{Q}$ output from flip-flop 470 of logic 0. Flip-flop 450 also receives the logic 11 output from the gate 448. The logic 0 output from the flip-flop circuit 454 is fed to the output of the NAND gate 442 to latch gate 442 to logic 1 until the RESET button 214 is pressed. Additionally, the Q output of flip-flop circuit 470 is applied to transistor 472 which resets all the latched gates 486-502 to reset the entire system to 0.

It will thus be understood that unless the proper sequence of four correct pushbuttons are sequentially pressed, that the car remains locked and the ignition may not be started.

Assuming that the vehicle has been started and the drive train of the vehicle has been unlocked, a positive voltage is applied to transistor 560 via lead 576. If the OVERRIDE pushbutton switch 212 is depressed, additional positive voltage is applied via lead 550 to latch the relay coil 558 through its own contacts such that the relay remains energized. Positive voltage is then applied to the OVERRIDE circuitry through the relay contacts. A logic 1 output is then provided at the output of NAND gate 590 which provides a logic 0 at the output of transistor 592. A logic 1 output is then provided at the output of gate 506. The START pushbutton switch 206 may then be depressed to start the engine and to unlock the car without the requirement of entering a predetermined combination into the encoder assembly.

The OVERRIDE circuitry thus allows starting of the engine by a parking lot attendant or the like upon the authorization of the vehicle owner. Each time the ON-OFF and the START switches 206 and 208 are operated by the parking lot attendant, however, positive voltage is applied to the transistor 600 which generates a pulse to the flip-flop 598. Flip-flop circuits 594 through 598 comprise binary ripple counters for controlling the number of times which the START pushbutton switch 206 may be operated in any one OVERRIDE cycle. The outputs of the flip-flops 594-598 are decoded and are fed to the input of the NAND gate 590. When three logic 1 inputs are applied to gate 590, a logic 0 occurs at the output thereof which unlatches the relay coil 558 and provides a logic 1 to the input of gate 506. Further bypass of the circuitry by the OVERRIDE pushbutton switch is thus prevented.

Although the present invention has been particularly described with respect to an anti-theft system for use on an automobile, it will be understood that the system could also be used to protect the locking mechanisms for bank vaults, home safes, home entrances and the like. In such cases, the locking mechanism described with respect to locking the transmission of the car will be applied to the lock desired to be protected. Additionally, although the present invention has been particularly described with respect to locking the drive train of an automobile, it will be understood that other variations are possible, such as the locking of the vehicle hood, the vehicle doors or the like. Although the invention has been particularly described with respect to mounting thereof within the passenger compartment of the vehicle, in some instances it may be desirable to mount the encoder assembly on the doors of the vehicle in order to require the depression of a predetermined code before entering into the automobile.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A security system for preventing the unauthorized use of a vehicle comprising:
    encoder means accessible to the vehicle operator for entry of a code sequence therein and for generation of electrical representations of the entered code sequence,
    decoder means, connected to said encoder means, for generating an energizing signal permitting said vehicle to be moved whenever a predetermined code sequence is entered into said encoder, and
    means for overriding said decoder means for a predetermined number of operation cycles of said vehicle.

2. The security system of claim 1 and further comprising:
    means for preventing ignition of the vehicle motor until generation of said energizing signal by said decoder means.

3. The security system of claim 1 and further comprising:
    means for resetting said decoder means to zero after generation of said energizing signal and after entry of a code sequence other than said predetermined code sequence.

4. The security system of claim 1 and further comprising:
    locking means for preventing movement of the transmission of said vehicle until reception of said energizing signal.

5. The security system of claim 4 wherein said locking means comprises:
    locking gear means for preventing movement of the gears of the vehicle transmission, and means for preventing movement of said locking gear until reception of said energizing signal.

6. A security system for a vehicle comprising:
    an encoder mechanism including means for having a plurality of codes sequentially entered therein,
    decoder circuitry responsive to the code entered within said encoder mechanism,
    means operable in dependence upon said decoder circuitry for locking the drive train of said vehicle until a predetermined code is entered into said encoder mechanism,
    means for resetting said decoder mechanism to zero if said predetermined code has not been entered into said encoder mechanism within a predetermined number of entries, means for inhibiting the ignition system of said vehicle motor until said predetermined code is entered into said encoder mechanism, and means for resetting said decoder circuitry when said vehicle motor is started.

7. The security system of claim 6 wherein said encoder mechanism comprises:

a panel having a plurality of button switches thereon, said decoder circuitry being responsive only to the energization of a predetermined sequence of a preset number of said switches in order to unlock the drive train of the vehicle and to enable ignition of the vehicle motor.

8. The security system of claim 6 and further comprising:

means enabling said predetermined code to be selectively varied.

9. An anti-theft system for use on a vehicle comprising:

an encoder including a plurality of switch means which may be energized in a plurality of sequences to generate a code, decoder circuitry coupled to receive said code and for generating a control signal in response thereto, means for locking the transmission of said vehicle and for preventing the application of electrical current to the ignition system of said vehicle until the reception of said control signal, and means for enabling normal operation of said vehicle for a predetermined number of times without requiring the generation of said control signal.

10. The anti-theft system of claim 9 and further comprising:

10 switch means each representative of a different numerical representation.

11. The anti-theft system of claim 9 and further comprising:

means for resetting said decoder circuitry to zero when the vehicle motor is started and when an incorrect code sequence is entered into said encoder panel.

12. An anti-theft system for use on a vehicle comprising:

an encoder panel including a plurality of switch means which may be manually energized in a plurality of sequences to generate a code, decoder circuitry coupled to receive said code and for generating a control signal in response thereto, means for allowing movement of said vehicle drive train and operation of the ignition system of said vehicle motor upon reception of said control signal, and means for enabling operation of said vehicle ignition system and drive train for a predetermined number of times without requiring energization of said switch means.

13. A security system for a vehicle comprising:

an encoder mechanism including means for entering sequentially a plurality of codes therein, decoder circuitry responsive to the code entered within said encoder mechanism and located in an area of said vehicle of difficult accessibility, means operable in dependence upon said decoder circuitry for locking the drive train of said vehicle until a predetermined code is entered into said encoder mechanism, means for inhibiting the ignition system of said vehicle motor until said predetermined code is entered into said encoder mechanism, means for resetting said decoder circuitry when said vehicle motor is started, and means for overriding said decoder circuitry for a predetermined number of cycles of operation of said vehicle to enable operation of said vehicle without the requirement of the entry of a code into said encoder mechanism.

14. A security system for a vehicle comprising:

an encoder mechanism including means for having a plurality of codes sequentially entered therein, decoder circuitry responsive to the code entered within said encoder mechanism and located in an area of said vehicle of difficult accessibility, said decoder circuitry including logic circuits responsive to digital input signals from said encoder mechanism, means operable in dependence upon said decoder circuitry for locking the drive train of said vehicle until a predetermined code is entered into said encoder mechanism, means for inhibiting the ignition system of said vehicle motor until said predetermined code is entered into said encoder mechanism, and means for resetting said decoder circuitry when said vehicle motor is started.

15. A security system for preventing the unauthorized use of a vehicle comprising:

a encoder means accessible to said vehicle operator for generation of electrical representations of the code sequence entered into said encoder means, said encoder means being disposed in the passenger compartment of said vehicle, decoder means disposed in the transmission housing of said vehicle and connected to said encoder means, said decoder means generating an energizing signal only when electrical representations are received according to a predetermined code sequence, and means normally preventing movement of said vehicle until reception of said energizing signal.

* * * * *